April 21, 1970　　　　　W. G. MULLEY　　　　　3,507,993
SITUATION DISPLAY FOR AIRCRAFT NAVIGATION EMPLOYING CRT
DISPLAY OF THE MEAN COURSE LINE
Filed Jan. 4, 1968　　　　　　　　　　　　　　2 Sheets-Sheet 2

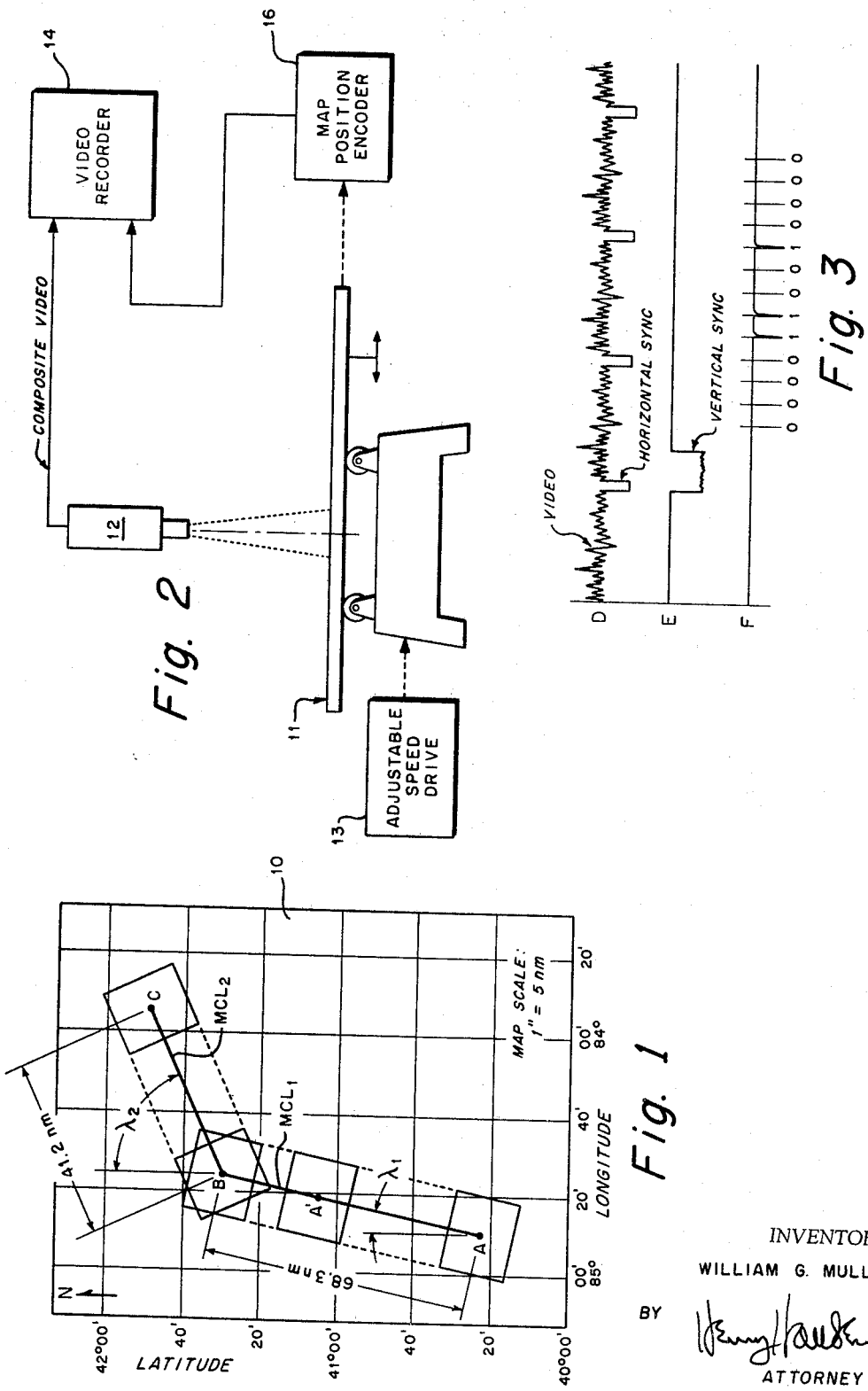

INVENTOR.
WILLIAM G. MULLEY
BY
ATTORNEY

United States Patent Office 3,507,993
Patented Apr. 21, 1970

3,507,993
SITUATION DISPLAY FOR AIRCRAFT NAVIGATION EMPLOYING CRT DISPLAY OF THE MEAN COURSE LINE
William G. Mulley, Warminster, Pa., assignor to the United States of America as represented by the Secretary of the Navy
Filed Jan. 4, 1968, Ser. No. 695,679
Int. Cl. H04n *5/78, 3/16*
U.S. Cl. 178—6.8
8 Claims

ABSTRACT OF THE DISCLOSURE

A method and apparatus for providing navigational and tactical information with correlative map information on a single CRT (cathode ray tube) display in an aircraft. The map information in video form is stored on a magnetic tape for a geographical area expected to be traversed during a mission of the aircraft. The tape is then placed in a video tape deck located in the aircraft at any conventional location and synchronized with aircraft ground position so that the navigational and tactical information generated during the mission are superimposed on the map information resulting in a single display in the aircraft instrument panel.

---

The invention described herein may be manufactured and used by or for the Government of the United States of America for governmental purposes without the payment of any royalties thereon or therefor.

BACKGROUND OF THE INVENTION

The increased complexity and sophistication of military aircraft missions have introduced a problem of presenting information to the pilot and crew of high-performance aircraft in a readily usable form consistent with time and space limitations. This presentation is commonly called the man-machine interface. One portion of this interface is a visual display of the aircraft's immediate environment in relation to other mission parameters. Characters and symbols representing navigational and tactical information are correlated with a moving map on which the aircraft's present position is indicated. In one technique of the prior art, a strip map is transported beneath a mechanical "bug" representing present position of the aircraft, and the navigational and tactical symbols are manually plotted. A more recent technique combines a transparent strip map moving in front of a CRT which displays radar and other navigational and tactical symbols. In either technique, considerable time is required in the preparation of the strip map for the aircraft; and when a number of aircraft are involved, even on the same mission, the preparation time is substantially compounded. Furthermore, a strip map consumes an inordinate amount of critical instrument control panel space to allow for the magazine loading and transport mechanisms compared to the actual display area obtained.

In still another technique of the prior art, the map information is optically projected through a window near the gun of the CRT onto the phosphorous surface of the CRT. In addition to the previously mentioned disadvantages, this latter technique requires a special CRT, the projection lamp generates considerable heat, the display is less visible under ordinary daylight conditions, and the overall costs are very high due to the sophisticated optics required for accurate correlation and resolution.

SUMMARY OF THE INVENTION

Accordingly, it is a general purpose of the present invention to optimize the man-machine interface with method and apparatus for continuous presentation of situation information to the pilot and crew of their immediate environment during a tactical mission. Other purposes and objects of the present invention are to provide a display of sufficient brightness to be clearly visible in a cockpit environment, to provide sufficient resolution and bandwidth to handle the output of any sensor presently contemplated, to provide sufficient flexibility for simultaneously presenting two or more sensors as desired, and to afford inherent simplicity in operation, manufacture, and supply.

These purposes and objects are achieved by recording map information in video form on a magnetic tape of a geographical route or area expected to be traversed by the aircraft during a mission by moving the map relative to a television camera at a predetermined speed and recording at the same time map position information in digital format on a separate channel of the tape. Before commencement of the mission, the tape is loaded into a video tape deck located in any convenient part of the aircraft where space permits. The speed of the tape deck is controlled at a speed proportional to the aircraft ground track along the route area. The composite video output from the tape deck is mixed with pertinent navigational and tactical information, and their combined signals are fed to a single CRT display.

BRIEF DESCRIPTION OF THE DRAWINGS

FIG. 1 represents a map as applied according to the invention having plotted thereon the expected course to be taken by the aircraft on a postulated tactical mission;

FIG. 2 is a schematic representation of apparatus according to the invention for video recording the information of the map of FIG. 1 on a magnetic tape;

FIG. 3 represents typical signals recorded according to the invention on the magnetic tape;

DESCRIPTION OF THE PREFERRED EMBODIMENT

Figure 4:
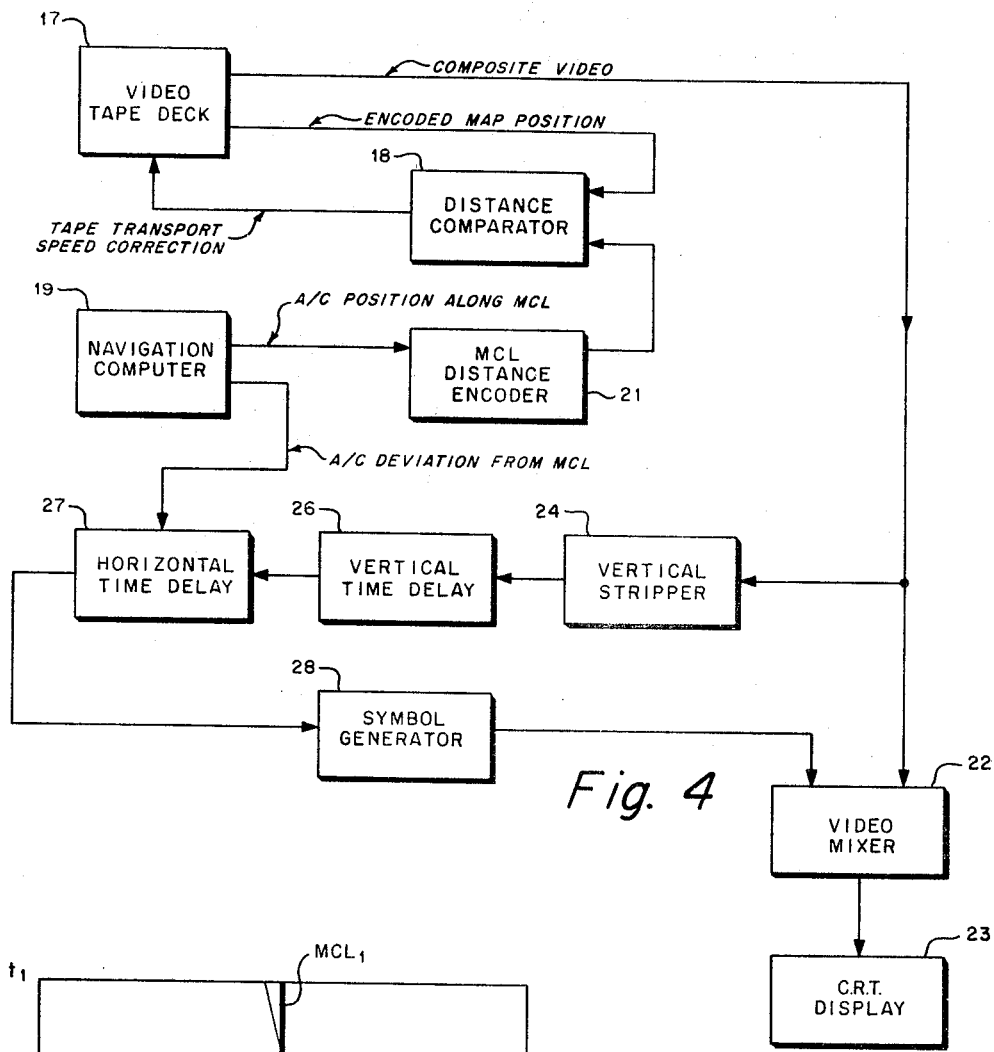
FIG. 4 is a schematic representation of apparatus according to the invention for correlating and displaying in the aircraft navigational and tactical information with geographical information.

Referring now to the drawings in more detail, a map 10, as applied to the present invention and as illustrated in FIG. 1, has plotted thereon the route or course expected to be taken by an aircraft on a postulated tactical mission. The course begins at point A and proceeds at a map angle $\lambda_1$ along a first mean course line $MCL_1$ to point B. At point B the course turns and proceeds to point C along $MCL_2$ at may angle $\lambda_2$. For purposes of illustration, a map scale of 5 NM (nautical miles) per inch and MCL distances A–B and B–C are 68.3 NM and 41.2 NM, respectively, have been selected. Of course it is understood that these values are merely exemplary and are not considered critical or essential limitations for practicing the invention. In fact, it may be desirable to include along the course depending on the degree of ground definition required for the mission maps of different scales. For example, a map scale of 15 NM per inch may be adequate for high altitude flights, whereas a map scale of 0.25 NM per inch may be required for very low altitude flights. The latter map scale would be particularly desirable as the aircraft approaches a target area on a reconnaissance or bombing mission.

FIG. 2 illustrates the apparatus for preparing a video tape of the map course. The map 10 is placed flat on a moveable platform, indicated generally by the numeral 11, directly beneath and in the focal plane of a television camera 12, the optical axis being normal to the platform 11 and passing through point A of the map. The platform 11 is moveable in either of opposite directions in the camera's focal plane and normal to the direction of the camera's horizontal sweep. The map is also oriented so that $MCL_1$ is aligned with the directions of motion of the platform 11. The traversing speed of the platform 11 is selected and maintained constant by an adjustable speed drive 13. The particular selected speed is determined by factors such as expected average speed of the aircraft along the route displayed in the map and operating characteristics of the camera, recorder and display system. For military applications, it is desirable that the traversing speed of the map not exceed 0.1 NM per horizontal sweep of the television camera in order to insure good resolution. For the particular map 10 of FIG. 1 and for an expected average aircraft speed of 540 miles per hour, the platform 11 must traverse along the MCL at 1.8 inches per minute. For a standard TV raster of 525 horizontal sweeps per frame and 15,750 sweeps per second, there will be theoretically $1.15 \times 10^{-5}$ NM per sweep, which is well within the desired maximum of 0.1 NM per sweep.

The composite video output of camera 12 is fed to a video recorder 14 operating at a constant tape transport speed such as an Ampex VR–1560 Videotape (trademark of Ampex Corporation). As shown in FIG. 3, the video and the horizontal sync pulse are recorded on a helical track D and the vertical sync pulse is recorded on a first straight track E. The position of the recorded video picture is correlated on the magnetic tape by means of a map positioning encoder 16. The encoder 16 senses platform position and produces a coded signal that is stored by the recorder 14 on a second straight track F (FIG. 3) of the magnetic tape. The map position signal is in a binary code representing the total distance along the mean course line from the initial starting point. In the illustrated example of FIG. 1, 13 bits are contemplated to record, to the nearest 0.1 NM, a total distance capability of 920.1 NM. Thus, exemplary binary codes of distances along the MCL of FIG. 1 are as follows:

| Map point | Distance from start to point | Corresponding binary code |
|---|---|---|
| A | 0.0 | 0 0 0 0 0 0 0 0 0 0 0 0 0 |
| A' | 40.5 | 0 0 0 0 1 1 0 0 1 0 0 0 0 |
| B | 68.3 | 0 0 0 1 0 1 0 1 0 1 0 1 1 |
| C | 109.5 | 0 0 1 0 0 0 1 0 0 0 1 1 1 |

Upon traversing $MCL_1$ to point B under camera 12, the map is turned so that $MCL_2$ is in the direction of travel of platform 11 and the traverse is continued to point C. If another map with a different map scale is to be used, such as for the last 20 miles before point C, the same procedures of recordation would apply except that the platform traverse rate would be readjusted. For example, though not illustrated, if the map scale were changed to 0.25 NM per inch, assuming no change in the average aircraft speed, the platform speed must be changed to 39 inches per minute.

Having thus video recorded the map course on magnetic tape, the tape is now ready for direct insertion into the aircraft display system hereinbelow described. Alternatively, the tape may be used to reproduce in fast time a number of additional tapes to be used in a plurality of aircraft which may be contemplated for the same tactical mission.

Referring now to the apparatus illustrated in FIG. 4, the magnetic tape, constituted according to the method and apparatus described hereinabove, is placed in a video tape deck 17 conveniently located in the aircraft and is cued to the encoded map position at point A, i.e., 0.0 NM. The deck 17 includes a variable tape transport drive responsive to a control signal from a distance comparator 18. The tape deck may be of any conventional design such as the Ampex VR–1560 supra. One output signal from the deck 17 is the encoded map position stored on the second track F of the magnetic tape which is connected to one input of the distance comparator 18. A navigation computer 19, such as the CP–915/ASQ–116 Navigation/ Weapon Delivery Computer, is programmed by well-known techniques to produce an output signal indicative of the total distance traveled from the starting point along the MCL. This signal is transformed by an MCL distance encoder 21 into a binary code comparable to the distance encoding on straight track F of the magnetic tape. The output signal of the encoder 21 is fed to the other input of the distance comparator 18. The two encoded distances are compared by any conventional technique and the comparator output signal representing both the magnitude and direction of any difference adjusts the tape transport speed accordingly so that the magnetic tape position remains synchronous with actual aircraft position along the MCL and the vertical coordinate of the actual aircraft position will be maintained at a fixed position on the video display, which in this embodiment is half-way up from the bottom.

Figure 5:
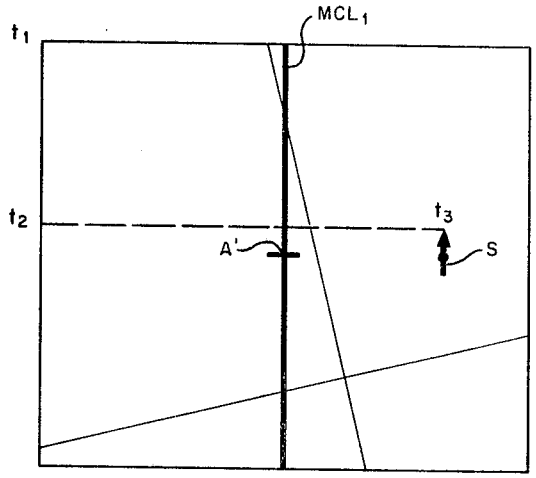
FIG. 5 represents a composite presentation according to the invention of a portion of the map of FIG. 1 and correlative navigation and tactical information.

The signals on tracks D and E of the magnetic tape appear at another output of the tape deck 17 as a composite video signal which is fed to one input of a video mixer 22 where it is combined with another input, described hereinbelow, for composite presentation on a CRT display 23. For the map 10 illustrated in FIG. 1 the presentation on display 23 at point A' along MCL, is illustrated in FIG. 5.

The off-course distance of the aircraft from the MCL is indicated in the display 23 by the position of a symbol S. This is accomplished by separating the vertical sync pulse in the composite video output from tape deck 17 with a vertical stripper 24 for triggering at a time instant $t_1$ a vertical time delay 26 at the beginning of each video frame (FIG. 5). At time instant $t_2$, fixed by the vertical height of the symbol S, a pulse is delivered from the vertical time delay 26 to a horizontal time delay 27 which produces another pulse at time instant $t_3$. The duration $t_3-t_2$ determines the horizontal position of the symbol S relative to the MCL. This duration is varied in the horizontal time delay 27 according to another output from the navigation computer 19 programmed, according to well-known state-of-the-art techniques, to produce a signal indicative of the aircraft deviation from the MCL. The output from the horizontal time delay 27 is connected to trigger a symbol generator 28 which produces unblanking signals for producing the symbol S in the desired configuration, such as the arrow shown in FIG. 5. The unblanking signal output from the symbol generator 28 is fed to the other input of the video mixer 22 for superpositioning the symbol S with the video from the tape deck 17 to produce a composite presentation on display 23. It is of course contemplated that other symbols representing altitude, air speed, etc., can be similarly mixed with the video for composite presentation on the CRT display 23 without departing from the fundamental concepts of the invention.

Some of the many advantages of the present invention should now be readily apparent. For example, in comparison to using strip chart overlays, there is a considerable saving of time and material in preparation, storage and procurement for drum displays. Critical instrument panel space in the aircraft is also spared as well as obtaining a reduction in overall weight and complexity. Except to the extent of meeting military specifications, the invention utilizes conventional, off-the-shelf components.

It should be understood that changes in the details, materials, steps and arrangement of parts which have been herein described and illustrated in order to explain the nature of the invention, may be made by those skilled in the art within the principle and scope of the invention as expressed in the appended claims.

I claim:

1. A method for providing a situation display in an aircraft during a tactical mission comprising the steps of:
   plotting a mean course line on a map of an expected ground track to be traversed by the aircraft on a preselected tactical mission;
   traversing the mean course line on the map at a constant speed with a television camera producing thereby a composite video signal;
   detecting and encoding a map position signal during said traversing;
   storing the video and map position signals on a tape;
   playing back the video map position signals in an airborne tape deck during the mission, the tape speed being controlled as a function of the aircraft position along the expected ground track; and
   displaying the composite video signal on a CRT display.

2. A method according to claim 1 further comprising the steps of:
   generating a symbol signal according to aircraft position laterally from the expected ground track; and
   mixing said signal with said video signal for composite display on a CRT.

3. Apparatus for providing a situation display in an aircraft during a tactical mission comprising:
   first means for recording a composite video signal on a tape of a map traverse along the expected ground track to be taken by the aircraft;
   second means operatively connected to said first means for recording an encoded map position signal on the tape during the map traverse;
   third means adapted to be installed in the aircraft for playback of the video and encoded map position signals in the aircraft during the mission;
   fourth means operatively connected to said third means for controlling the tape speed in said third means according to aircraft ground track position; and
   fifth means operatively connected to said third means for receiving and displaying the video in the aircraft.

4. Apparatus according to claim 3 further comprising:
   sixth means operatively connected between said third and fourth means for generating a symbol signal according to aircraft position laterally from the expected ground track; and
   seventh means operatively connected between said third, fifth and sixth means for receiving said composite video and symbol generating signals for producing a composite video signal to said fifth means.

5. Apparatus according to claim 4 wherein said first means further comprises:
   a television camera adapted to be maintained in a fixed position;
   a traversible platform positioned directly beneath said camera and having a planar top normal to the optical axis and in the focal plane of said camera for receiving the map, the top being traversible in either of opposite directions in the focal plane and normal to the direction of the horizontal sweep of said camera;
   an adjustable speed drive operatively connected to said platform for selecting and maintaining a constant top-traversing speed; and
   a tape recorder connected to said camera for receiving on a magnetic tape the composite video signal produced by said camera.

6. Apparatus according to claim 5 wherein said second means further comprises:
   means connected to said platform for continuously sensing the position thereof and for producing a binary encoded map position signal at the output thereof.

7. Apparatus according to claim 6 wherein said fourth means further comprises:
   a navigation computer having a first output signal according to aircraft position along the expected ground track and a second output signal according to aircraft position laterally from the expected ground track;
   a distance encoder receiving said first output signal and providing a first binary encoded aircraft position signal; and
   a distance comparator receiving the encoded map and aircraft position encoded signals and providing a tape transport speed correction signal to control the speed of a tape transport drive in said third means.

8. Apparatus according to claim 7 wherein said sixth means further comprises:
   a vertical stripper for receiving the composite video signal and providing a vertical sync pulse at the output thereof;
   a vertical time delay receiving said vertical sync pulse and producing a first pulse delayed an amount determined by the desired vertical position of a symbol to be generated;
   a horizontal time delay receiving said first pulse and said second output signal from said navigation computer and producing a second pulse delayed an amount determined by said second output signal; and
   a symbol generator for receiving said second pulse for initiating a symbol generating signal to said seventh means.

References Cited

UNITED STATES PATENTS

| 3,267,263 | 8/1966 | Nelson et al. | 35—10.2 |
| 3,328,889 | 7/1967 | Malakowski et al. | 35—10.2 |
| 3,400,399 | 9/1968 | Kline | 235—150.27 |

ROBERT L. GRIFFIN, Primary Examiner

D. E. STOUT, Assistant Examiner

35—12, 10.2; 178—6.6; 235—150.26, 150.27